United States Patent [19]

Sarbeck et al.

[11] Patent Number: 5,176,878
[45] Date of Patent: Jan. 5, 1993

[54] ZIRCONIUM-HAFNIUM SEPARATION PROCESS

[75] Inventors: Lawrence E. Sarbeck, Scio; David R. Lee, Lebanon. both of Oreg.; Lawrence J. Jacoby, Redding, Calif.; John C. Haygarth, Corvallis, Oreg.; Charles T. Goodwin, Tangent, Oreg.; William A. Crocker, Salem, Oreg.

[73] Assignee: Teledyne Industries, Inc., Albany, Oreg.

[21] Appl. No.: 355,478

[22] Filed: May 23, 1989

[51] Int. Cl.⁵ .................... C22B 34/10; C01G 25/00; C01G 27/00; B01D 11/02
[52] U.S. Cl. ......................................... 423/70; 423/73
[58] Field of Search .......................... 423/70, 73, 81

[56] References Cited

U.S. PATENT DOCUMENTS 2.938.769  5/1960  Overholser et al. .................. 423/70
3.006.719  10/1961  Miller ..................................... 423/70
4.202.862  5/1980  Jacoby et al. ......................... 423/70

FOREIGN PATENT DOCUMENTS 625995  8/1961  Canada ................................. 423/73

Primary Examiner—Gary P. Straub
Assistant Examiner—Steven Bos
Attorney, Agent, or Firm—Shoemaker and Mattare, Ltd.

[57] ABSTRACT

A process for separating zirconium values from hafnium values wherein an aqueous solution of $ZrCl_4$ and $HfCl_4$ is contacted with $NH_4SCN$, feeding the resultant solution into a solvent extraction system containing aqueous HCl and MIBK, separating off the solvent phase containing MIBK, HSCN, hafnium thiocyanate complex, and any decomposition products of HSCN to leave the aqueous phase raffinate containing $NH_4Cl$, zirconium oxide-chloride and low concentrations of HSCN, scrubbing the hafnium values from the separated solvent phase, treating the scrubbed solvent phase containing MIBK and HSCN with $NH_4OH$ to convert the HSCN to $NH_4SCN$, separating the $NH_4SCN$ from the treated solvent phase, treating the separated solvent phase to remove essentially all thiazolines, and scrubbing residual HSCN from the raffinate with the desulfurized solvent phase.

1 Claim, 1 Drawing Sheet

5,176,878

ZIRCONIUM-HAFNIUM SEPARATION PROCESS

This invention concerns the preparation of pure zirconium from ore which may be, for example, zircon or baddeleyite, etc., and which typically also contains varying amounts, e.g., about 2-3% by weight, of hafnium containing materials.

In the processing of zircon ore to recover pure zirconium, it is conventional to comminute zircon with petroleum coke, chlorinate the products thereof and separate the crude zirconium tetrachloride ($ZrCl_4$) containing hafnium values from by-products such as carbon monoxide and silicon tetrachloride, and then complex the zirconium and hafnium values with ammonium thiocyanate ($NH_4SCN$), and extract from an acidic aqueous solution the hafnium complex from the zirconium complex with an organic solvent such as methyl isobutyl ketone (MIBK). This process is described in the literature and, more particularly, in U.S. Pat. Nos.: 2,938,769; 3,069,232; 3,006,719; and 4,202,862; and the references cited therein, the disclosure of which are incorporated herein by reference.

In the operation of such a process, it is conventional practice to recover the extracting solvent and $NH_4SCN$ which are expensive materials, and which are employed in large quantities in this process. Exemplary apparatus, process, and conditions for carrying out such solvent and $NH_4SCN$ recovery is described in the aforesaid U.S. Pat. No. 3,006,719; wherein, in the present process as described hereinafter in detail, separation columns 3, 4 and 5 thereof and their operating parameters substantially as described therein may be employed. However, as described in the aforesaid U.S. Pat. No. 4,202,862, the regeneration of solvent and $NH_4SCN$, has been attended with the problem of producing objectionable odors from the process apparatus.

In general in such separation procedures for isolating zirconium and hafnium values, the zirconium and hafnium raffinates are subsequently treated with regenerated solvent to remove thiocyanic acid (HSCN), then steam-stripped to recover dissolved and entrained solvent, then treated with ammonium sulfate to precipitate zirconium or with ammonia ($NH_3$) to precipitate hafnium. The precipitated metal values are recovered by filtration and calcined to produce oxides. When certain organic sulfur compounds, produced in the solvent and $NH_4SCN$ regeneration step, contact the acid raffinates, they are converted to noxious odiferous compounds, and can then easily escape into the atmosphere, since filtration, calcination and the like, are typically not conducted in sealed equipment.

It is a principal object of the present invention, therefore, to provide a process for separating zirconium and hafnium values wherein a thiocyanate complexing agent is employed, and wherein the odor problems caused by certain sulfur compounds formed in the $NH_4SCN$/solvent regeneration procedures, are essentially eliminated.

BRIEF DESCRIPTION OF THE INVENTION

These and other objects hereinafter appearing have been attained in accordance with the present invention which is defined in its general sense as the process for separating zirconium values from hafnium values comprising the steps:

(A) forming a solvent extraction system comprising an organic solvent phase and an acidic aqueous phase;

(B) feeding to or forming in-situ in said system thiocyanate complexes of zirconium and hafnium;

(C) maintaining a concentration of HSCN in said system;

(D) separating the solvent phase containing the hafnium values and HSCN from the aqueous zirconium raffinate;

(E) stripping the hafnium values from the solvent phase from (D) to produce an aqueous hafnium raffinate;

(F) returning a major portion of the stripped solvent from (E) to the extraction system of (A);

(G) separating the thiocyanate ($SCN^-$) values from the minor portion of stripped solvent from (E);

(H) removing from the solvent from (G) essentially all thiazolines;

(I) scrubbing said zirconium and hafnium raffinates with the purified solvent from (H) to remove essentially all HSCN values therefrom;

(J) stripping with steam dissolved and entrained solvent from the scrubbed raffinates (I); and (K) returning said recovered solvent (J) to (G).

DETAILED DESCRIPTION OF THE INVENTION

Figure 1:
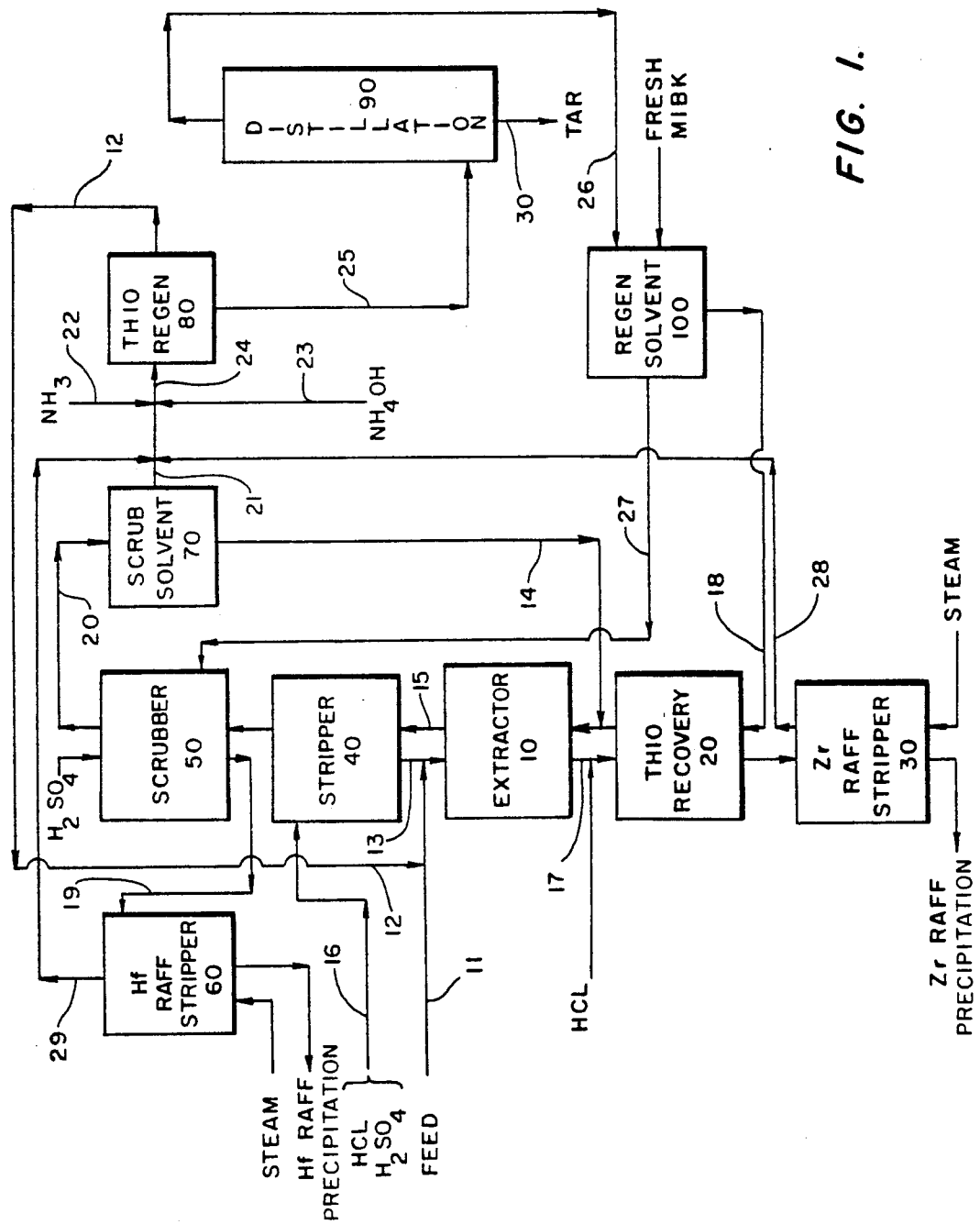
FIG. 1 is a partial schematic of the zirconium-hafnium separation process of the present invention.

Referring to the schematic in FIG. 1, crude $ZrCl_4$ containing the hafnium material, or as stated in U.S. Pat. No. 3,006,719, the oxychloride (oxide-chloride) of the metals, dissolved in water and adjusted to an acidity of about 5 normal with aqueous ammonia ($NH_4OH$) is introduced via line 11 to the $NH_4SCN$ stream line 12. In a manner substantially described in said U.S. Pat. No. 3,006,719, the resultant material is fed into the extraction column 10 containing the liquid-liquid extraction media MIBK and thiocyanate. It is noted that thiocyanate complexes of the zirconium and hafnium may also be formed in the extraction column.

Hydrochloric acid (HCl) and sulfuric acid ($H_2SO_4$) are passed to the top of column 10 via line 13 from column 40 while MIBK and thiocyanate recycle are added at the bottom via line 14. At the top of column 10, an organic phase comprising MIBK, hafnium thiocyanate complex, and other compounds, is recovered and passed via line 15 to column 40 where it is countercurrently contacted with downwardly flowing $H_2SO_4$ and HCl entering via line 16. At the bottom of column 10, a zirconium oxychloride ($ZrOCl_2$) solution or raffinate is recovered via line 17. In addition to $ZrOCl_2$, the recovered raffinate will contain ammonium chloride ($NH_4Cl$) and HSCN, which may be recovered by scrubbing, in column 20, with the purified MIBK via line 18 in accordance with the present invention as more fully described hereinafter. From the bottom of column 50, the acid-scrubbed hafnium material is recovered via line 19 and will comprise primarily hafnium oxysulfate and $H_2SO_4$; MIBK and HSCN are recovered at the top of column 50 and passed via lines 20 and 24 to thiocyanate regeneration mixer settler 80 wherein the HSCN is reacted with $NH_3$ and $NH_4OH$ entering the mixer settler via lines 22, 23, and 24. The $NH_4SCN$ recovered from the mixer settler 80 is passed via line 12 for admixture in with the zirconium and hafnium oxychloride solution to column 10. MIBK is recovered from mixer settler 80 and passed via line 25 to distillation column 90. Distilled MIBK passes via lines 26 and 18 to the thiocyanate recovery column 20. Distilled MIBK also passes via lines 26 and 27 to column 50 for thiocyanate recovery. It is contemplated that from about 60 to 80% of the MIBK and HSCN recovered at the top of column 50 is recycled directly via line 14 into column 10.

The above description of the basic structural elements and material flow patterns are, as stated above, substantially as described in U.S. Pat. No. 3,006,719, except for distillation column 90. As will now be described, the present invention utilizes additional and uniquely placed equipment and flow patterns.

Referring further to the schematic, in Applicants' process, a distillation column 90 is placed in line 25 and is operated to essentially completely purify all the solvent from the thiocyanate regeneration mixer-settler 80. It is particularly noted that this unit 90 is operated as a pure distillation unit and not merely a partial steam stripping unit, with the result that all sulfur-containing compounds such as the thiazolines which are precursors for the formation of odiferous mercaptoketones in the acidic aqueous phase are removed. The bottoms or tars, containing the sulfur compounds and the precursor thiazolines, are continuously removed via line 30. The distillation eliminates these precursors from the recycle regenerated solvent system. It is also noted that the point of entry of this purified recycle solvent into the extraction columns 20 and 50 are such as to intimately scrub essentially all of the residual thiocyanate from the zirconium and hafnium raffinates and thus further insure a thiocyanate-free raffinate for use in subsequent processing. The purified MIBK will also scrub odiferous mercaptoketones from the raffinates and therefore insure that subsequent processing does not release the odiferous mercaptoketone compounds to the atmosphere. The point of contact of the raffinate with the purified solvent may, of course, be outside of the extraction columns 20 and 50. There are substantial advantages in retaining solvent and scrubbed-out thiocyanate within the column for use therein.

Useful and typical operating feed rates and conditions for the basic process in which the present invention is utilized are described in detail in the aforesaid U.S. Pat. No. 2,938,769, and are specifically enumerated in Example 1 thereof, with the modification, of course, of there being essentially zero concentration of thiazolines in the purified MIBK stream from the present distillation unit going to the raffinate scrubbers. The distillation unit 90 can be of conventional design and construction and may be plate or packed column or the like and sized according to the throughput of a particular system design. If properly sized the distillation unit should readily accommodate the solvent feed rates as described, for example, in the aforesaid U.S. Pat. No. 2,938,769, or even scaled up to commercial quantities on the order indicated in the aforesaid U.S. Pat. No. 4,202,862. It is noted that multiple apparatus units and multiple purification passes may be utilized as is well known to the art and illustrated, for example, in U.S. Pat. No. 2,938,769, wherein a supplemental HCl stripping operation is employed for improving zirconium values recovery. Any separation technique which removes sulfur-containing compounds, such as the thiazoline precursors, from the regenerated solvent may be utilized as well.

In addition to the odiferous mercaptoketone compounds being removed by the purified MIBK in columns 20 and 50, the raffinates from columns 20 and 50 feed steam stripper columns 30 and 60 respectively to remove dissolved and entrained MIBK. The MIBK-free raffinates are further processed into oxides. The MIBK removed from the raffinates is captured and passed via lines 28, 29 and 24 to the thiocyanate regeneration mixer-settler 80. This mercaptoketone-containing MIBK enters mixer-settler 80 and when it leaves via line 25 the odiferous mercaptoketones have been converted into sulfur-containing thiazoline compounds, which are subsequently removed in distillation column 90. This recycle of MIBK to the thiocyanate regeneration mixer-settler 80 is a precaution to remove odiferous mercaptoketone compounds should the distillation column not achieve complete removal of the odor precursor thiazolines or experience an upset condition.

In certain preferred embodiments of the invention, the $SCN^-$ values of (G) are converted to $NH_4SCN$ prior to or during separation thereof from the solvent, the $NH_4SCN$ is used to form the thiocyanate complexes of (B), the zirconium and hafnium raffinates are essentially isolated from the extraction system before scrubbing with purified solvent from (H) in (I), solvent from (G) for scrubbing is purified in (H) by distillation, the scrubbed raffinates are steam-stripped to recover solvent in (J), and the recovered solvent is returned to (G).

In the present process, the HSCN-free solvent from (G) is treated in step (H) to remove other materials, particularly elemental sulfur and sulfur compounds dissolved or suspended in it. Of particular importance is the removal in this step of certain thiazolines, which on contact with aqueous acid in steps (I) and (J) are hydrolyzed to produce odiferous mercaptoketones.

It has been demonstrated by F. Asinger et al, *Annalen der Chemie*, Vol 672, (1964), pages 156–178, that reaction of MIBK with sulfur and $NH_3$ at 20 degrees C to 40 degrees C for eight hours produces a mixture of 2-methyl-2,4-diisobutyl-$\Delta^3$-thiazoline (i) and 2,4-dimethyl-2-isobutyl-5-isopropyl-$\Delta^3$-thiazoline (ii). In the publication and in a subsequent one (ibid, pages 179–193), they show that these $\Delta^3$-thiazolines are hydrolyzed by aqueous acid to give, in the case of (i), 1-mercapto-4-methyl-2-pentanone (iii), and in the case of (ii), 3-mercapto-4-methyl-2-pentanone (iv). These mercaptoketones are detected by the human nose at concentrations in air in the range below one part per billion (ppb), and have a highly unpleasant odor which has been compared by some to that of the urine of the domestic cat. Asinger et al also show, as reported in their above-cited first publication, that mercaptoketones (iii) and (iv) will react with $NH_3$ and MIBK to yield, respectively, the $\Delta^3$-thiazolines (i) and (ii).

The presence of the thiazolines (i) and (ii) and of the mercaptoketones (iii) and (iv) in zirconium-hafnium separation process streams was established as follows.

Before step (H) was instituted, an impinger trap containing dilute $H_2SO_4$ was used to sample a particularly odiferous discharge, that from the exhaust of a pump used to generate the vacuum required for the filters with which zirconium sulfate is recovered after precipitation from the zirconium raffinate of (I). The $H_2SO_4$ was extracted with chloroform, and the chloroform extract submitted to gas chromatography, with mass spectroscopic analysis of each material eluted from the chromatography column. In this way it was shown that a chromatogram peak previously associated with the mercaptoketone odor was a mixture of the two isomeric mercaptoketones (iii) and (iv). Positive identification of these compounds by gas chromatography was henceforth possible.

Again before step (H) was instituted, a sample of zirconium raffinate was taken from the process after step (I), that is, after contact with regenerated solvent for the purpose of removing HSCN. This sample was extracted with chloroform, and the chloroform extract submitted to gas chromatography, with mass spectroscopic analysis of each material eluted from the chromatography column as before. The mercaptoketones (iii) and (iv) were found in this sample too, but also found were the two $\Delta^3$-thiazolines (i) and (ii). The chromatographic peaks associated with the thiazolines were now identified, so that subsequently these materials could be detected chromatographically.

By these expedients, the odiferous compounds were positively identified, the presence of thiazolines in the process stream was demonstrated, and the exact nature of the compounds responsible for certain gas-chromatographic peaks established.

In the following, we show that sulfur is always present in the equipment in which step (G) is carried out. We show that reaction of $NH_3$, sulfur and MIBK indeed results in formation of the $\Delta^3$-thiazolines (i) and (ii) as claimed by Asinger et al, and that hydrolysis of these $\Delta^3$-thiazolines with aqueous HCl indeed produces the mercaptoketones (iii) and (iv), again in agreement with the findings of Asinger et al. We show that the $\Delta^3$-thiazolines (i) and (ii) are always detectable in the solvent from step (G), and that mercaptoketones (iii) and (iv) are always detectable in the zirconium raffinates from step (I) and especially in the recovered solvent from step (J) unless the solvent from step (G) has been subjected to purification by use of step (H). Further, we show that the mercaptoketones (iii) and (iv) found in the recovered solvent from step (J), when solvent from step (G) has not been purified by step (H), are converted to the $\Delta^3$-thiazolines (i) and (ii) by treatment with $NH_3$. Finally, we show that the $\Delta^3$-thiazolines (i) and (ii) are essentially completely removed when the solvent is subjected to a treatment such as, for example, fractional distillation, as in step (H).

Samples of solid materials from the equipment used to carry out step (G) were submitted for X-ray powder-diffraction examination. The angular positions of the X-ray diffraction-peaks, taken with CuK radiation, were converted to d-spacing values and compared with those tabulated by the Joint Committee on Powder Diffraction Standards (JCPDS), Card No. 24-733, for orthorhombic sulfur, as shown in Table 1. It is seen that the correspondence is conclusive evidence that the solids are orthorhombic sulfur.

TABLE 1 d-Spacings and peak intensities for solids from thiocyanate regeneration equipment and for orthorhombic sulfur as given by JCPDS, 24-733.

| Solids from thiocyanate regeneration | | Orthorhombic sulfur | |
| --- | --- | --- | --- |
| d, A | $I/I_o$ | d, A | $I/I_o$ |
| 4.07 | 15 | 4.060 | 12 |
| 3.93 | 22 | 3.918 | 16 |
| 3.86 | 100 | 3.854 | 100 |
| 3.59 | 11 | 3.570 | 7 |
| 3.46 | 37 | 3.447 | 37 |
| 3.35 | 46 | 3.336 | 22 |
| 3.23 | 49 | 3.219 | 41 |
| 3.12 | 26 | 3.113 | 20 |
| 3.10 | 18 | 3.084 | 15 |
| 2.86 | 22 | 2.848 | 17 |
| 2.63 | 17 | 2.625 | 11 |
| 2.58 | 5 | 2.569 | 3 |
| 2.51 | 15 | 2.502 | 7 |
| 2.43 | 11 | 2.426 | 12 |
| 2.38 | 7 | 2.378 | 4 |
| 2.30 | 6 | 2.289 | 6 |
| 2.12 | 19 | 2.113 | 11 |
| 1.992 | 5 | 1.9892 | 3 |
| 1.905 | 11 | 1.9038 | 8 |
| 1.823 | 5 | 1.8236 | 5 |
| 1.786 | 12 | 1.7824 | 12 |
| 1.757 | 6 | 1.7563 | 7 |
| 1.726 | 9 | 1.7271 | 7 |
| 1.702 | 7 | 1.6785 | 8 |

Sulfur (24 g) was added to MIBK (187 ml) in a four-neck flask fitted with an inlet tube reaching to the bottom of the flask, an outlet tube starting well above the liquid level, a stirrer, and a thermometer. The temperature was raised to 40 degrees C and $NH_3$ gas bubbled through the stirred mixture at a rate of a few bubbles per second for eight hours. The reaction mixture was cooled to room temperature, the liquids decanted away from the settled solids, the aqueous layer rejected and the organic layer diluted with ether, washed neutral with water, dried with anhydrous sodium sulfate ($Na_2SO_4$), separated from the $Na_2SO_4$, and the ether distilled away. The residue left after ether removal was distilled under vacuum, and following Asinger et al, the fraction boiling at 60 degrees C to 70 degrees C at a pressure of 0.3 mm of mercury (Hg) was collected. This was analyzed by gas chromatography, and the presence of the thiazolines (i) and (ii) established.

Following further the procedures of Asinger et al, the fraction boiling at 60 degrees C to 70 degrees C and 0.3 mm Hg (4 gm) was added to a mixture of 1N HCl (200 ml) with dioxane (50 ml) in a flask fitted with a reflux condenser and boiled under total reflux for five hours. The flask and its contents were cooled, extracted with ether and the ether solution washed with dilute sodium bicarbonate solution, then with water, until neutral, then dried with anhydrous $Na_2SO_4$. The ether was then distilled away, and the residue fractionally distilled at a pressure of 11.5 mm of Hg. Two fractions were recovered, one boiling at 62 degrees C to 68 degrees C and another boiling at 72 degrees C to 74 degrees C. These boiling ranges are consistent with those given by Asinger et al for mercaptoketones (iii) and (iv). The presence of mercaptoketones (iii) and (iv) in the samples was confirmed by gas chromatography.

Acid hydrolysis of the thiazoline mixture to yield the mercaptoketones (iii) and (iv) was demonstrated without the presence of dioxane.

Samples of solvent from step (G) were repeatedly analyzed by gas chromatography, and peaks characteristic of the $\Delta^3$-thiazolines (i) and (ii) identified routinely.

Before operation of step (H) for purification of regenerated solvent, samples of solvent recovered by steam-stripping aqueous raffinates that had been treated for removal of HSCN invariably showed high levels of mercaptoketones when analyzed by gas chromatography. When this solvent was treated with $NH_4OH$, analysis by chromatography showed conversion of the mercaptoketones to thiazolines.

Samples of regenerated solvent from step (G) were subjected to laboratory-scale, batchwise fractional distillation and early, middle and late fractions analyzed for thiazolines by subjecting them to acid hydrolysis then analyzing for mercaptoketones. The results of this were that mercaptoketones were undetectable in the products of acid hydrolysis of the first third of the solvent to be distilled, and this was sufficiently encouraging to test a continuous, pilot-scale distillation of regenerated solvent. This was done as described in the following example.

EXAMPLE

A pilot-scale distillation system was designed and assembled to remove odiferous mercaptoketone precursors from regenerated solvent. The system consisted primarily of a 50-liter glass reboiler, a 6" ID ×9 ft high packed column, and a stainless-steel water-cooled condenser. The reboiler was equipped with an internal steam coil constructed of $\frac{3}{4}$" zirconium tubing and having a heat-transfer surface area of approximately 30 ft$^2$. The column section was packed with nearly nine feet of $\frac{5}{8}$" ceramic saddles supported by a bottom sieve plate. The overhead condensate product was collected in a 20-gallon stainless steel storage tank; some of this material was refluxed to the top of the column as required to achieve the desired mass-transfer efficiency. All process equipment, except for the condenser, was insulated to minimize heat losses.

A 56-hour distillation run was performed using this system. Regenerated solvent, having an average total solids concentration of 1.75 g/l, was continuously introduced to the column at a feedrate of about six gallons per hour, and distilled solvent was continuously withdrawn as product. The reboiler temperature was maintained at 135 degrees C by adding 28 pounds per hour of saturated steam at 57-58 psig. Three gallons per hour of distilled solvent were refluxed back to the column, giving a reflux ratio of 0.5.

Pressure drop across the packing and support plate was $\frac{3}{8}$ inch of water. The condenser cooling water flowrate was 1.3 gallons per minute; the water inlet and outlet temperatures were 19 and 25 degrees C, respectively. The heavy liquid in the reboiler, containing sulfur, high-boiling "tars" and the thiazoline precursor compounds, exhibited a total solids concentration of approximately 500 g/l. A half liter of this material was tapped as bottoms every eight hours, resulting in a solids concentration factor of roughly 300:1.

The overhead distillate product obtained during this run was water-clear, and subsequent chromatographic analysis did not detect the presence of odiferous mercaptoketone precursors (the chromatogram only showed the peak for MIBK and some instrument noise). Distillate samples were also subjected to acid hydrolysis at elevated temperature in the laboratory in an attempt to generate odiferous mercaptoketones from any residual thiazoline precursor compounds which may have been present. In this procedure, solvent, 20 ml, was intimately contacted with sufficient 2N HCl to give a total volume of two liters. One liter of the resulting aqueous solution was then refluxed for 90 minutes at 103-105 degrees C. After any floating solvent was removed, the sample was submitted for analysis. No odiferous mercaptoketones were detected, confirming that precursor-free solvent had indeed been produced. Therefore, fractional distillation is an acceptable technique for removing thiazolines from regenerated solvent and thereby substantially eliminating odiferous mercaptoketone emissions.

The invention has been described in detail with particular reference to preferred embodiments thereof, but it will be understood that variations and modifications will be effected within the spirit and scope of the invention.

We claim:

1. A method of removing $\Delta^3$-thiazolines found during a zirconium-hafnium separation process comprising the steps of:
   (A) forming a solvent extraction system comprising a ketone-containing organic solvent phase and an acidic aqueous phase;
   (B) feeding to or forming in-situ in said system thiocyanate complexes of zirconium and hafnium;
   (C) maintaining a concentration of HSCN in said system;
   (D) separating the solvent phase containing the hafnium values and HSCN from the aqueous phase containing zirconium raffinate;
   (E) stripping the hafnium values from the solvent phase from (D);
   (F) returning a major portion of the stripped solvent from (E) to the extraction system of (A);
   (G) separating the SCN$^-$ values from the minor portion of stripped solvent from (E);
   (H) removing from the solvent from (G) essentially all thiazolines by distillation; and
   (I) scrubbing said zirconium raffinate and hafnium raffinate with the purified solvent from (H) to remove essentially all HSCN impurity therefrom.

* * * * *